United States Patent [19]

Sandström et al.

[11] Patent Number: 5,316,076

[45] Date of Patent: May 31, 1994

[54] METHOD AND ARRANGEMENT FOR AN ENFORCED HEAT TRANSMISSION BETWEEN ALIMENTARY BODIES AND GASES

[75] Inventors: Roland Sandström; Ann Maxe, both of Stockholm; Tore Strandberg, Nacka; Lars Lundsten, Kävlinge; Alvar Andersson, Viken, all of Sweden

[73] Assignee: Frigoscandia Food Process Systems AB, Helsingborg, Sweden

[21] Appl. No.: 679,004

[22] PCT Filed: Oct. 31, 1989

[86] PCT No.: PCT/SE89/00621

§ 371 Date: Jun. 18, 1991

§ 102(e) Date: Jun. 18, 1991

[87] PCT Pub. No.: WO90/05277

PCT Pub. Date: May 17, 1990

[30] Foreign Application Priority Data

Nov. 1, 1988 [SE] Sweden .................. 8803973

[51] Int. Cl.⁵ .............................. F28F 13/10
[52] U.S. Cl. .................... 165/84; 165/120; 34/164; 34/171; 34/174; 34/360; 34/279; 62/63
[58] Field of Search ............ 165/84, 120; 34/10, 34/164, 171, 174; 62/538, 539, 63

[56] References Cited

U.S. PATENT DOCUMENTS 2,664,274 12/1953 Worn et al. .
4,334,366 6/1982 Lockwood .................. 34/164
4,359,962 11/1982 Olsson et al. .
4,624,220 11/1986 Olsson .................. 165/84
4,650,413 3/1987 Olsson et al. .

FOREIGN PATENT DOCUMENTS

WO88/07894 10/1988 PCT Int'l Appl. .
WO90/00095 1/1990 PCT Int'l Appl. .
00417-4 7/1986 Sweden .
05616-4 8/1986 Sweden .
06653-0 5/1989 Sweden .
805050 2/1981 U.S.S.R. .
1032294 7/1983 U.S.S.R. .
1174695 8/1985 U.S.S.R. .................. 62/63
356783 10/1931 United Kingdom .

OTHER PUBLICATIONS

"Heat Exchange of a Cylinder with Low-Frequency Oscillations" by V. B. Repin, 1982, pp. 651-655.

Primary Examiner—Albert W. Davis, Jr.
Attorney, Agent, or Firm—Birch, Stewart, Kolasch & Birch

[57] ABSTRACT

A method and arrangement for enforced heat transmission between a solid or liquid alimentary body and an ambient gas takes place in connection with cooling/freezing or when cooking, frying or drying the entire part or parts of the alimentary body. This method and arrangement uses a low-frequency standing sound wave. The apparatus uses a low-frequency sound generator having a pulsator part and a resonator part. The resonator part is acoustically virtually closed and is designed so that the alimentary body, which is to be exposed to enforced heat transmission, is located within a zone inside the resonator part where the standing sound wave has a particle velocity anti-node.

34 Claims, 5 Drawing Sheets

FIG_8

METHOD AND ARRANGEMENT FOR AN ENFORCED HEAT TRANSMISSION BETWEEN ALIMENTARY BODIES AND GASES

FIELD OF THE INVENTION

The present invention relates to a method and an arrangement for enforced heat transmission between an alimentary body, solid or liquid, and an ambient gas. In particular, the invention relates to heat transmission from relatively small solid alimentary bodies, which occur in large amounts, and where it is desirable to fluidize the alimentary bodies constituting a product flow in order to improve both the heat transmission and the motion of the alimentary bodies. The enforced heat transmission is achieved in that the ambient gas is set in oscillatory motion which is generated by a standing sound wave of low frequency and in that the alimentary bodies are placed in that part of the sound wave where the oscillatory motion is greatest.

DESCRIPTION OF THE BACKGROUND ART

A fundamental problem in cooling/freezing alimentary bodies, i.e. products intended as food for human beings or animal fodder, is that the transferred thermal effect per surface unit from the alimentary body to a gas flow enveloping the alimentary body will be low at low gas flow rates. In order to transfer large thermal effects, high gas flow rates are required, which implies that a large air flow will be necessary. At the same time, however, the temperature rise in the air will be slight. The large flow entails that cooling/freezing will be expensive and, in consequence of the slight temperature rise, the energy in the heated air can seldom be utilized.

Depending on, among other things, the feeding temperature of the alimentary bodies, their consistency, thickness etc., variations in transit time must be foreseen in order to achieve the desired outlet temperature of the alimentary bodies. The transmit time, i.e. the time during which the alimentary bodies are present in the cooling/freezing chamber, is generally controlled by the feed rate of the product flow, so that a low feed rate result in a longer transmit time than a high feed rate would.

It is previously known from V. B. Repin, "Heat exchange of a cylinder with low-frequency oscillations", Zhurnal Prikladnoi Mehaniki i Tekhnicheskoi, No. 5, pp. 67-72, September-October 1981, that heat transmission may be improved by generating a sonic field in the liquid. It is also previously known that it is advantageous if such a sonic field is of low frequency.

It will be obvious from the two parameters sound pressure and particle velocity in a sonic field that it is the particle velocity which provides the enforced heat transmission. It is also obvious that the heat transmission increases with increasing particle velocities. The reason why the prior-art method of employing low-frequency sound for heating or cooling of bodies has not hitherto enjoyed any practical importance is that there have not been any usable method or apparatus for generating sound with a sufficiently high particle velocity throughout the entire surface of the body intended to be cooled, or alternatively, heated.

SUMMARY OF THE INVENTION

The object of the present invention is to solve the above mentioned problem and to attain a method and an arrangement for achieving enforced heat transmission by transferring high thermal effect per surface unit from a alimentary body to ambient gas, especially for applications in which the alimentary body consists of a quantity of small solid alimentary bodies, for example granules or pellets or drops. Instead of increasing the heat transmission by passing the gas over the surface of the alimentary body at high speed, the enforced heat transmission is achieved by imparting to the ambient gas a low frequency oscillation. For the purposes of clarifying the present invention, different embodiments thereof regarding to cooling/freezing will be described.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The nature of the present invention and its aspects will be more readily understood from the following brief description of the accompanying drawings which are given by way of illustration only, and thus are not limitative of the present invention, and wherein.

DETAILED DESCRIPTION OF THE PREFERRED EMBODIMENTS

Figure 1:
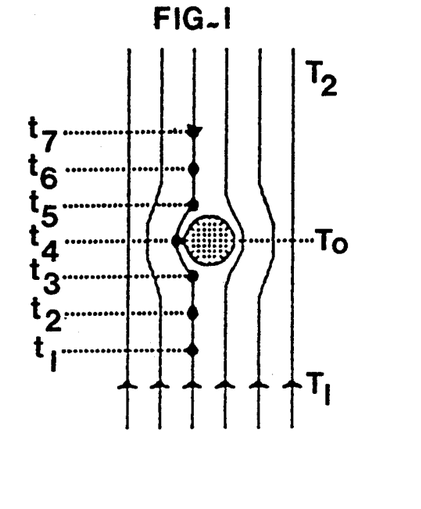
FIG. 1 shows a solid body in a constant velocity air flow.
Figure 2:
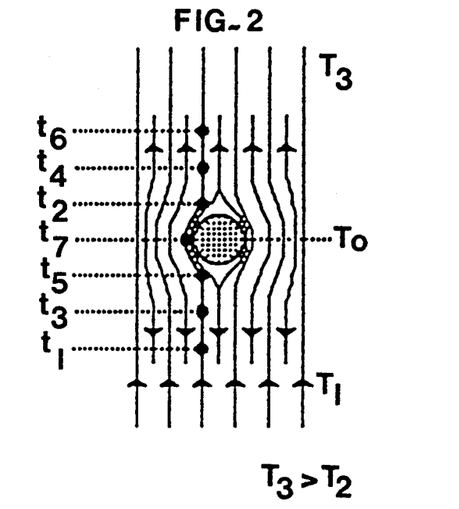
FIG. 2 shows a solid body in an air flow which is exposed to an infrasonic field.

As mentioned above, enforced heat transmission may be achieved between the surface of a alimentary body and an ambient gas if the gas is influenced so as to reciprocate with the aid of a standing sound wave generated in the gas. FIG. 1 shows a solid alimentary body at a temperature $T_0$ which is exposed to an air flow. A particle of the air flow is marked as a dot and the position of the air particle at various points of time is marked by $t_1$-$t_7$. The temperature of the air flow is $T_1$ before it has passed the alimentary body, and $T_2$ after the alimentary body has been passed. FIG. 2 shows the same solid alimentary body which is exposed to the same air flow, but under the influence of infrasonic sound. Even here the position of the air particle at different points of time is marked by $t_1$-$t_7$. As will be apparent from FIG. 2, because of the pulsating air low generated by the low frequency sound, each air particle which passes the solid alimentary body, will pass not just once but a plurality of times. If the alimentary body is at a higher temperature than the airflow, the air particle will absorb more and more heat each time it passes the solid alimentary body, and the temperature of the alimentary body will be correspondingly reduced. Enforced heat transmission will thus be obtained.

In certain parts of the standing sound wave, the velocity of the oscillating motion of the gas, the so-called particle velocity, is high, while the pressure variations, the so-called sound pressure, are slight, In other parts, the pressure variations are great while the velocity of the oscillating motion is low. At a certain point, both the particle velocity and the sound pressure will thus vary with time and, under ideal conditions, will describe a sinusoidal oscillatory motion. The highest value of the particle velocity and the sound pressure, respectively, is indicated by the amplitude of each respective oscillatory motion. As a rule, the amplitude of the particle velocity assumes a maximum value, i.e. has a so-called particle velocity anti-node, at the same time as the amplitude of the sound pressure assumes a minimum value, i.e. has a so-called sound pressure node.

It is desirable, in accordance with the foregoing, that the particle velocity assumes a value as high as possible in order to obtain that maximum enforced heat transmission. In a standing sound wave, there may be several points where the particle velocity amplitude assumes its maximum level. In a standing sound wave whose length corresponds to a quarter or a half wavelength, or alternatively a part of a quarter of a half wavelength, the amplitude of the particle velocity has a maximum only at one point. In order to obtain an enforced heat transmission as high as possible, the surface from whence the heat transmission is to take place should therefore be sited at a position as close to the particle velocity antinode as possible.

In the method according to the present invention, enforced heat transmission between an alimentary body, solid or liquid, and a gas, as shown in FIG. 2, is realized in that a standing, low-frequency sound wave is generated in a closed, or in any case acoustically virtually closed, sound resonator. The term low-frequency sound is here taken to mean sound at a frequency of 50 Hz or lower. The reason why frequencies above 50 Hz are less interesting is that such a closed half-wave resonator has such small dimensions at high frequencies that the whole arrangement will be uninteresting due to the low capacity of the arrangement. Since possible disruptive sound fades at lower frequencies, a frequency of 30 Hz or lower should preferably be used. At this frequency, disturbances may be considered as very slight. The sound resonator is preferably of a length corresponding to a half wavelength of the generated low-frequency sound, but other designs of the sound resonator are also possible. The sound wave is obtained in that air bubbles are generated by a so-called pulsator located at a sound pressure anti-node in the resonator. The term pulsator is here employed to indicate that part of a generator for low-frequency sound which generates a particle velocity in one point in a resonator where a high sound pressure prevails, see for example Swedish patent No. 446 157 and Swedish patent applications Nos. 8306653-0, 8701461-9 and 8802452-6. Somewhere in the resonator a particle velocity anti-node will occur and here the alimentary body is supplied which is to be exposed to enforced heat transmission. When freezing alimentary bodies susceptible to fluidization, that is the alimentary body in question is provided as granules, pellets or similar which in their fluidized state would have an angle of repose $a=0°$, then the total heat transmission from the alimentary bodies in their fluidized state will increase due to the relative mutual separation of the individual alimentary bodies. Thus it is apparent that the fluidizing property of the particle velocity of the sound has a favourable influence on the heat transmission.

In the case that the alimentary body in question, which constitutes an obstacle to the sound, becomes all too large, this is revealed in that the sharpness of the resonance of the resonator becomes poorer, which means that the ratio between the amplitude of the particle velocity in the anti-node and that in the node decreases. In a condition with large losses there is therefore no reason to generate the standing sound wave with the aid of a long resonance tube. By placing the pulsator closer to the particle velocity anti-node, the resonance tube can be shortened.

Figure 3:
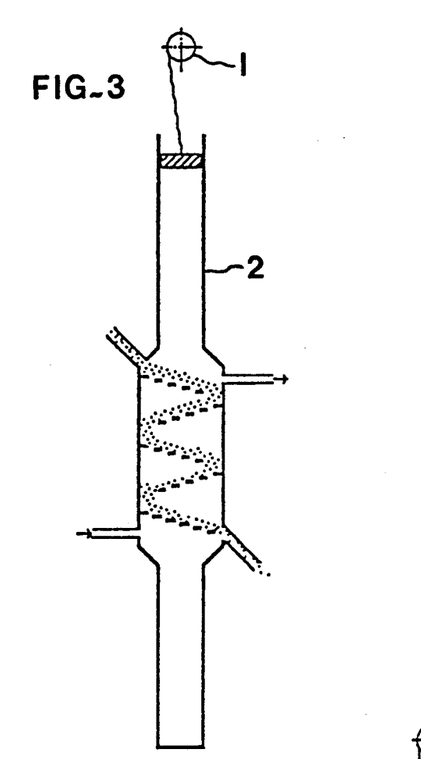
FIG. 3 shows an embodiment of an arrangement according to the invention.
Figure 4:
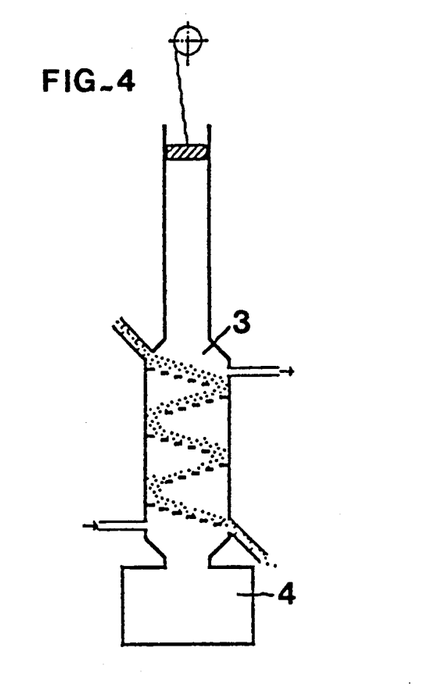
FIG. 4 shows another embodiment of an arrangement according to the invention.
Figure 5:
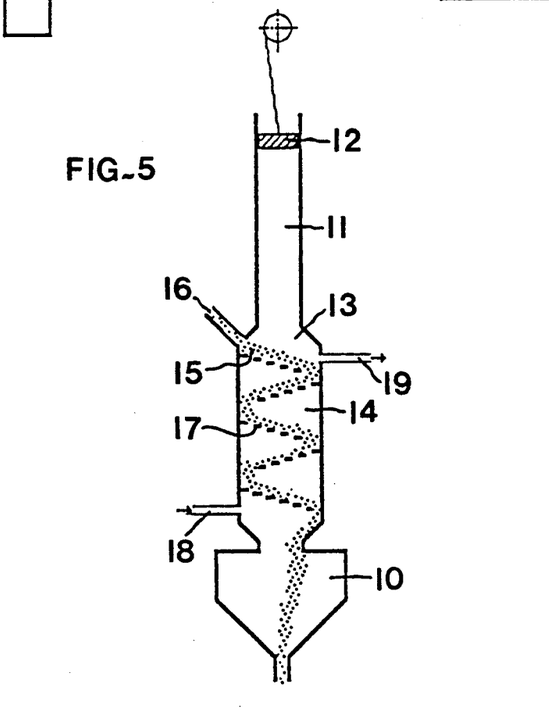
FIG. 5 shows a third embodiment of the invention which can be used in an installation for cooling alimentary bodies.
Figure 6:
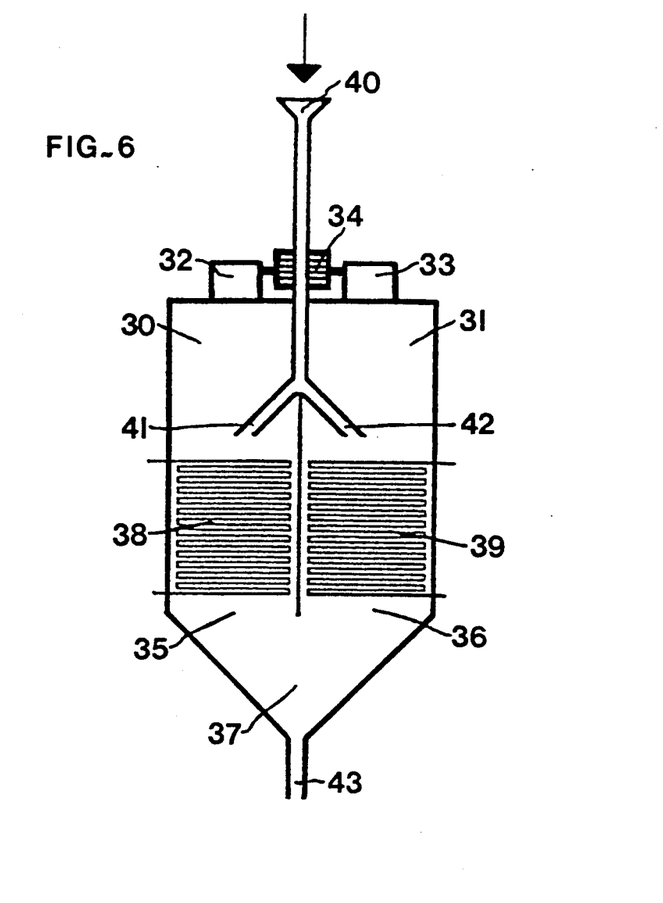
FIG. 6 shows a fourth embodiment of an arrangement according to the invention which is particularly suitable for cooling of alimentary bodies after, for instance, blanching.

When practically designing the sound resonator there are several possibilities. Examples of different designs, i.e. embodiments, are illustrated in FIGS. 3-9, the principles of which are briefly described hereinafter. In all cases an acoustically closed system is aspired to. FIG. 3 shows a generator for low-frequency sound with a pulsator 1 and a resonator 2 with a length corresponding to a half of a wavelength of the generated low-frequency sound. A particle velocity anti-node occurs in an area close to the center of the resonator and consequently the substance which is to be exposed to enforced heat transmission is supplied just above the center of the resonator and drained just below the center thereof. FIG. 4 shows a resonator which functions in the same manner as the resonator in FIG. 3 with the difference that the lower half of the resonator has been replaced by a resonator of Helmholtz type. Here there is thus a tube resonator 3 with a length corresponding to a quarter of a wavelength combined with a Helmholtz resonator 4 which is so dimensioned that it is tuned for the same resonance frequency as the tube resonator, implying that the tube resonator and the Helmholtz resonator in this case jointly form a resonator. In FIG. 5, the Helmholtz resonator of FIG. 4 has been given a funnel shape so that the substance which is to be exposed to enforced heat transmission is collected by the Helmholtz resonator 10 and, through an opening in its bottom, is passed on FIG. 6 shows another embodiment in which two resonators 30, 31 each with a length corresponding to a quarter of a wavelength, have been placed side by side so that their open ends are in communication with each other. Two pulsators 32, 33 generate a standing sound wave of the same frequency in each resonator. By permitting these pulsators to operate in counterphase, there is generated one single common standing sound wave. In principle, this joint resonator functions in the same manner as a half-wave resonator.

In case a sound resonator has irregular shape the appearance of the amplitude of the particle velocity is influenced so that the original sinusoidal wave becomes difficult to recognize. To volume density of the sound, however, is not influenced in the same way and instead it retains its sinusoidal shape, which in periodicity coincides with the amplitude of the particle velocity. In case of a sound resonator of irregular shape it may thus be more appropriate and easier to identify the area where the largest heat transmission can be obtained as the area where the volume velocity has an anti-node.

The invention will now be described in greater detail with reference to different embodiments which concern cooling/freezing.

FIG. 5 illustrates an arrangement for freezing alimentary bodies, such as green peasmay for example an infrasonic generator of the type described in the Swedish patent application 8802452-6 can be used. This comprises a tube resonator 11 which preferably has a length equivalent to a quarter of a wavelength, at one end of which a pulsator 12 is mounted. At its other end it is provided with a diffuser 13 which is directly mounted on a freezing chamber 14 through the upper end of which alimentary bodies 15 such as granules are supplied via a supply pipe 16. Together with the diffuser, the freezing chamber and the Helmholtz resonator 10, the tube resonator forms a resonator corresponding to a half-wave resonator. The diffuser and the freezing chamber are situated within an area in which a volume velocity anti-node occurs. The alimentary bodies 15 fall by gravitation down through the freezing chamber 14. This is furnished with a plurality of inclined obstacles 17 which momentarily catch the alimentary bodies so that the transport time of the alimentary bodies through the area with a high volume velocity is prolonged. The obstacles consist preferably of trays fitted with nets, but the obstacles may also have other designs which permit air to pass through them while the alimentary bodies are unable to pass through them, e.g. pipes, beams or similar. At the lower end of the freezing chamber there is provided the Helmholtz resonator 10 which functions like a funnel and catches the alimentary bodies for further transport to a container. At the upper part of the Helmholtz resonator, cooling air is supplied by a fan through a duct 18. This air rises up through the freezing chamber and is heated by the alimentary bodies. The heated cooling air is discharged through a duct 19.

Enforced heat transmission is obtained between the alimentary bodies and the gas, in this case air, influenced by low-frequency sound. When the alimentary bodies are caught by the trays the air motion generated by the sound accomplishes fluidization of the alimentary bodies.

FIG. 6 shows another embodiment for cooling/freezing of particle shaped alimentary bodies after, for instance, blanching. The arrangement consists of two resonators 30, 31 both of which have a length corresponding to a quarter of a wavelength. Located at the upper end of each respective resonator is a pulsator 32, 33 which even in this case may appropriately be of the type described in the Swedish patent application 8802452-6 or equivalent. These two pulsators 32, 33 are driven by a common motor 34, such that they operate in counterphase with each other. By this means a single common standing soundwave is generated in the two resonators, which are situated side by side so that their open ends 35, 36 are communicating through a joint space 37. In the lower part of each respective resonator and in the proximity of the joint space 37, a zone is obtained displaying a volume velocity anti-node which constitutes the actual cooling/freezing chamber. Installed in the cooling/freezing zone are obstacles in the form of pipes 38, 39 which are conveyed to and fro several times within the cooling/freezing zone and thus form two pipe systems. A cooling agent such as water, ammonia, freon or similar, flows through these pipes. The particle-shaped alimentary bodies to be cooled/- frozen are supplied to the arrangement from above through a pipe 40 which has two branches 41, 42, emanating immediately above the two pipe systems. The supplied particle-shaped alimentary bodies pass slowly down through the pipe systems due to gravitation and are cooled/frozen during this passage. The outside of the pipe systems thus constitutes a convection surface so that heat transmission takes place first between the particle-shaped alimentary bodies and the air inside the resonators and thereafter between the air and the convection surface. The heat absorbed by the coolant is subsequently led off to be used, for example for heating alimentary bodies in a blanching device. When the particle-shaped alimentary bodies have been cooled/frozen and have passed the obstacles 38, 39 they are collected and removed through a pipe 43 situated at the lower portion of the joint space 37.

Figure 7:
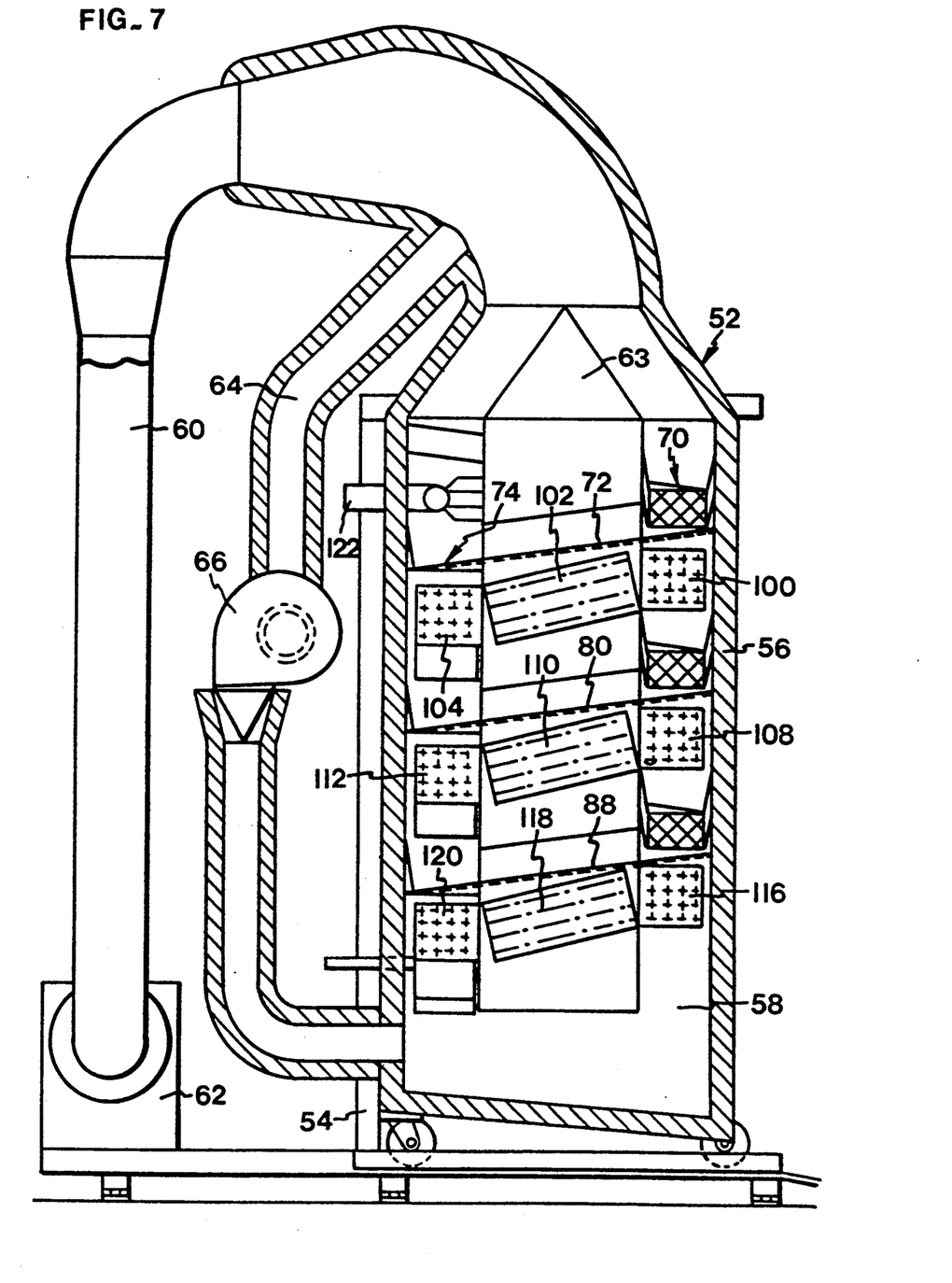
FIG. 7 shows a cross section view of a freezer including the invention.

FIG. 7 shows a preferred embodiment of a freezer 52 according to the invention, which comprises an insulated housing 56 supported by a stand 54. The insulated housing 56 encloses a freezing chamber 58 with an open upper end which is connected with a tube resonator 60. Via the tube resonator 60, infrasonic soundwaves, generated by a pulsator 62 enter the upper portion of the freezing chamber where they are dispersed into the entire freezing chamber 58 by means of a wave divider 63 in the shape of a pyramid.

In the preferred embodiment of the freezer according to the invention, as shown in FIG. 7, the upper portion of the freezing chamber 58 is, furthermore connected to a fan duct 64 which emanates, via the passing of a fan 66, into the lower portion of the freezing chamber 58. It is preferable that also the fan duct 64 is provided with heat insulation.

Figure 8:
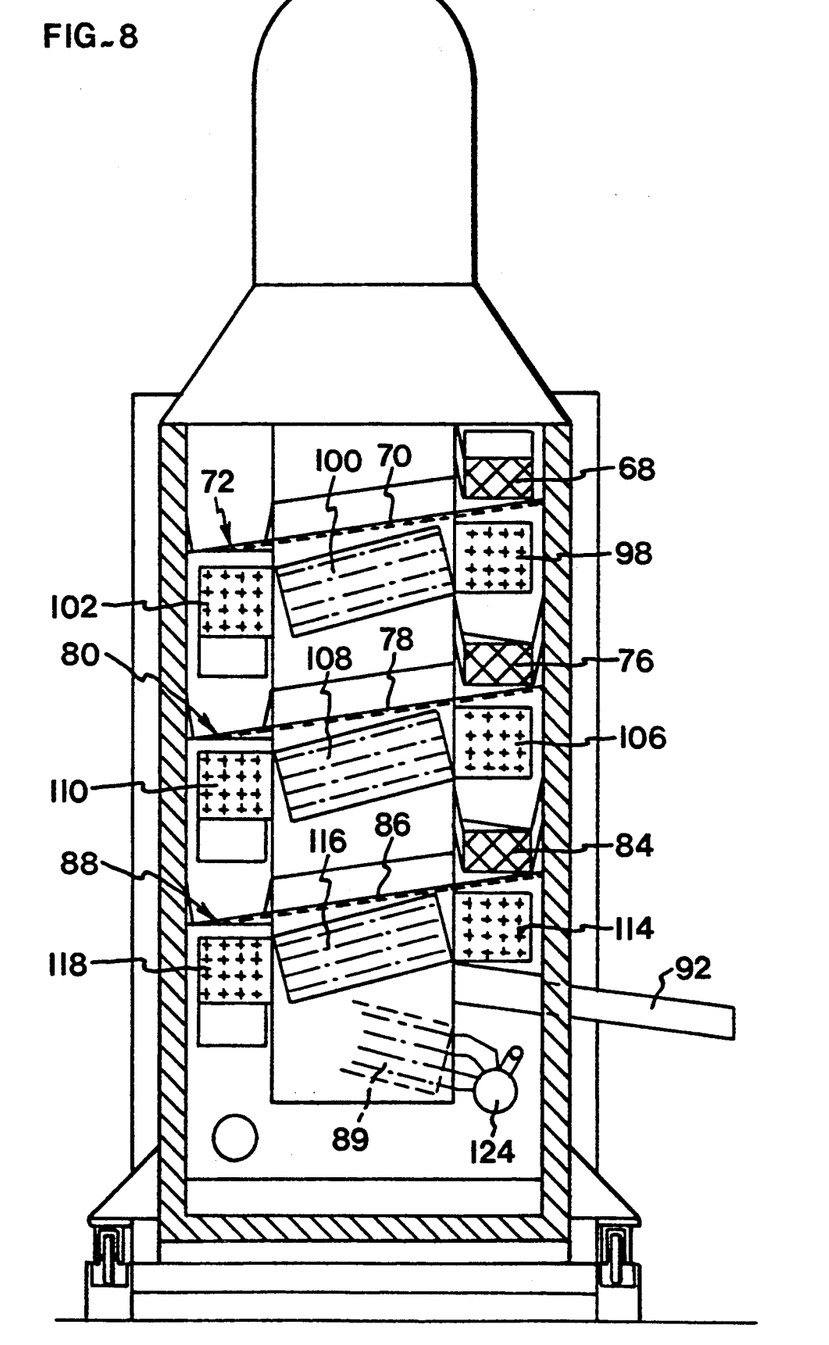
FIG. 8 shows another sectional view of the freezer in FIG. 7, which illustrate, in particular, the path of the track and the cooling pipes.

FIGS. 7 and 8 illustrate particularly well the inclination of the perforated obstacles or tray bottoms 68, 70, 72, 74, 76, 78, 80, 84, 86, 88. The uppermost tray bottom 68 is communicating with a product inlet 90 (see FIG. 9), while the lowermost bottom is communicating with a product outlet 92. Alimentary bodies introduced via the product inlet 90 slide down the tray bottom until they reach the edge of the tray bottom in question, then they fall onto the next, adjacent tray bottom situated at an angle of 90° to the previous tray bottom. The infrasonic soundwaves oriented virtually transversally across the respective tray bottom thus contribute to enhanced heat transmission and a more speedy heat transport between the alimentary bodies and a cooling agent circulating inside pipes of cooling batteries 98, 100, 102, 104, 106, 108, 110, 112, 114, 116, 118, 120 arranged underneath the respective bottoms. At 92, the completely or partially frozen alimentary bodies will finally leave the freezing chamber 58 for further treatment such as packing, storing etc.

Figure 9:
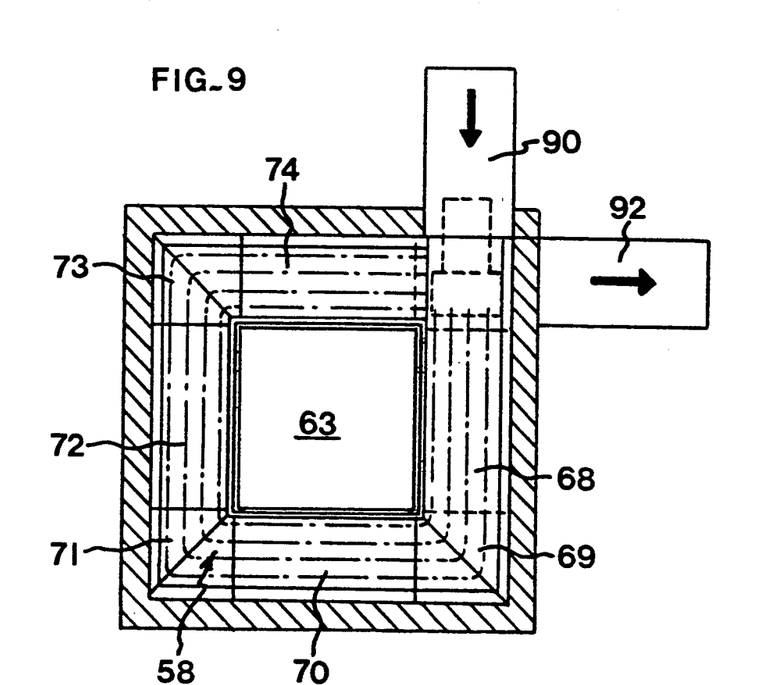
FIG. 9 shows an elevational view of a freezing chamber of the freezer shown in FIGS. 7 and 8.

FIG. 9 shows a top view of the freezing chamber 58 of the freezer 52 shown in FIGS. 7 and 8. At the upper side-surface in FIG. 9, the product inlet 90 is shown, and at the side-surface to the right in FIG. 9, the product outlet 92 is shown. The flow direction of the products is indicated with arrows. The essentially rectangular, perforated tray bottoms 68, 70, 72, 74 form a helical curved track down which the products to be frozen are transported. The tray bottoms may be perfectly rectangular in which case they are connected, in the corner areas, to corner sections 69, 71, 73, but they may as well have oblique corners and in that case the corners of two adjacent tray bottom parts have ends cut at an angle of 45° in order to form a right angle when mounted together. In another embodiment, the tray bottoms are furthermore adjustable with a view to change the pitch angle of the helical curved track.

Moreover, as is shown in FIG. 8, the cooling batteries 98, 100, 102, 106, 108, 110, 114, 116, 118 are arranged immediately below the respectively tray bottom 68, 70, 72, 76, 78, 80, 84, 86, 88. Each and everyone of these is preferably assembled of a plurality of cooling pipes which are illustrated with a "+"-sign in the sectional views of FIGS. 7 and 8. The cooling battery 98, installed underneath the bottom 68 which is communicating with the product inlet 90, has an outlet 122 for a cooling agent arranged at one of its ends (see FIG. 7), while the other end of the cooling battery is connected with a cooling battery 100 situated below the next, adjacent tray bottom 70 (see FIGS. 8 and 9). A cooling battery 89, shown in FIG. 8 but only schematically with a dashed line, and located underneath the tray bottom being connected to the product outlet 92, is connected to both a preceeding cooling battery and an inlet 124 for a cooling agent. The connections between the individual cooling batteries may be flexible to allow adjustment of the inclination of the cooling batteries in accordance with the inclination of the respective tray bottom.

During operation, the products that are to be frozen are fed into the freezer 52 through the product inlet 90. The products slide down the inclined tray bottoms and are frozen gradually. The standing soundwave inside the freezing chamber 58 accelerate the freezing process through quicker heat transport between the alimentary bodies and the cooling batteries. The frozen alimentary bodies are eventually discharged through the product outlet 92 for further treatment, such as packing, storing etc.

When freezing alimentary bodies susceptible to fluidization, it is especially preferable to utilize the infrasonic sound to transfer the bodies into the fluidized state. The alimentary bodies to be frozen are thus transferred into fluidized state while passing into the freezing chamber 58 via the product inlet 90, due to the fact that the freezing chamber is being furnished with infrasonic sound generated by the pulsator 62; and they will preferably remain in this state until they leave the freezer via the product outlet 92. Alternatively, the above-mentioned tray bottoms may be essentially horizontal with a difference in level between two adjacent tray bottoms. If a "dead zone", i.e. a zone within which no fluidization takes place thus causing non-fluidized alimentary bodies to build up a wall, is allowed at the end of each respective tray bottom than a fluidization zone is created above this tray bottom and between the ends of the tray bottom. By continuously feeding alimentary bodies, the fluidized alimentary bodies will overflow the wall and reach the next fluidization zone at a distance below the previous, until the alimentary bodies leave the freezer through the product outlet 92.

If the speed of the product flow, during fluidization on substantially horizontal tray bottoms, should be too low, it is preferred to direct the infrasonic soundwaves in such a way that they form an acute angle with the tray bottom, the horizontal component of the infrasonic soundwaves thus increasing the speed of the product flow. When freezing alimentary bodies with difficult properties regarding the freezing process, e.g. sticky products, it is preferredle to operate the fan 65 which is located in the fan duct 64 between the top of the freezing chamber and the lowermost part of the freezing chamber in order to accomplish the intended technical effect.

It has been shown that the introduction of infrasonic sound technique in connection with a freezer increases the heat transmission and the heat transport between alimentary bodies to be frozen and cooling batteries, and that this technique may eliminate the use of fans, especially if the cooling batteries are installed in close proximity of the product flow and under the condition the condition that the intensity of the infrasonic sound is sufficiently high. The result is quicker freezing and an increased efficiency rate in particular resulting from the face that there are no moving parts inside the freezer, such as fans, that need maintenance, defrosting etc. A special advantage with the infrasonic sound technique is that the infrasonic wound may be utilized for fluidization of products susceptible to fluidization, which increases the productivity even more.

Even if the infrasonic sound technique here has been described in relation to a new and preferred freezer, it is also applicable to cooling and other kinds of processes for alimentary products where enforced heat transmission is desirous, for example heating such as frying, cooling, drying etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. Method for enforced heat transmission, by means of sound, between an ambient gas and a surface of a solid alimentary body, when one of cooling/freezing, cooking, frying and drying at least a portion of the alimentary body, the method comprising the steps of generating a low-frequency standing sound wave and locating said surface in a zone of the standing sound wave which is situated in proximity to a particle velocity anti-node, the sound wave being provided with only one particle velocity anti-node.

2. Method as claimed in claim 1, characterized in that the method is used on alimentary bodies having dimensions which are considerably less than one-fourth of the wavelength of said sound wave.

3. Method as claimed in claim 1, characterized in that a large number of alimentary bodies are passed through said sound waves as a continuous flow.

4. Method as claimed in claim 3, characterized in that the flow is provided with an inlet to the sound wave and an outlet from the sound wave and that the inlet is situated at a distance above the outlet.

5. Method as claimed in claim 4, characterized in that the said flow of alimentary bodies is transported between the inlet and the outlet only by gravitation.

6. Method as claimed in claim 5, characterized in that transmit time of the bodies between the inlet and the outlet is prolonged by a device, the device being selected from the group consisting of obstacles and tray bottoms placed in the transport path of the bodies.

7. Method as claimed in claim 6, characterized in that the alimentary bodies are fluidized on the device selected from one of said obstacles and tray bottoms on account on the influence of the low-frequency sound.

8. Method as claimed in claim 6 or claim 7, characterized in that the sound wave is generated at an acute angle to said tray bottoms, in order for the sound wave to influence the flow speed of the alimentary bodies.

9. Method as claimed in claim 6 characterized in that the flow of products is directed across a perforated tray bottom, which is essentially helical curved.

10. Method as claimed in any one of claims 1, 3, 4, 5, 6, 7 or 9, characterized in that the sound wave is directed to surround an immobile convection surface and in that heat transmission takes place between the gas and said convection surface.

11. Method as claimed in claim 1, further comprising the steps of transporting the alimentary body along a device, the device being selected from the group consisting of obstacles and tray bottoms, the method further comprising the step of cooling the alimentary body by a cooling agent in pipes positioned beneath the device.

12. Arrangement for an enforced heat transmission, by means of sound, between the surface of an alimentary body and an ambient gas, including a low-frequency sound generator comprising a pulsator part and a resonator part, characterized in that the resonator part is acoustically virtually closed and so designated that the alimentary body which is to be exposed to the enforced heat transmission is located within a zone inside the resonator part where a standing sound wave generator by the pulsator has a particle velocity anti-node, the sound wave being provided having only one particle velocity anti-node.

13. Arrangement as claimed in claim 12, characterized in that all the dimensions of said body are significantly smaller than a quarter of the wavelength of said sound wave.

14. Arrangement as claimed in claim 13, characterized in that said alimentary body is one of a granule or pellet.

15. Arrangement as claimed in any one of claims 12-14, characterized in an inlet to the sound wave and an outlet from the sound wave for a large number of alimentary bodies passing through said sound wave as a continuous flow and that the inlet is situated at a distance above the outlet.

16. Arrangement as claimed in claim 15, characterized in a device selected from the group consisting of obstacles and tray bottoms is placed in the transport path of the alimentary bodies between the inlet and the outlet.

17. Arrangement as claimed in claim 16, characterized in that said tray bottoms comprise means for allowing the passage of gas but preventing the passage of alimentary bodies therethrough, the means for allowing being selected from the group consisting of nuts, pipes and beams.

18. Arrangement as claimed in claim 16, characterized in that said tray bottoms form an essentially helical curved, continuous track.

19. Arrangement as claimed in claim 18, characterized in a device arranged for altering the inclination of the helical curved track.

20. Arrangement as claimed in claim 16, characterized in an inlet for a cooling agent situated below the tray bottoms from which a cooling gas is supplied to the resonator, and an outlet for said cooling agent situated above the tray bottoms through which the cooling gas is drained from the resonator.

21. Arrangement as claimed in claim 16, characterized in a pipe system installed between the tray bottoms through which a cooling agent is transported.

22. Arrangement as claimed in claim 21, characterized in that the outside of the pipes of said pipe system constitutes a convection surface and in that said pipe system is a part of a heat-exchanger system.

23. Arrangement as claimed in claim 16, characterized in that the tray bottoms consist of a pipe system through which a cooling agent is transported.

24. Arrangement as claimed in claim 16, characterized in a fan for one of increasing the heat transmission from the alimentary bodies to the cooling system and for facilitating the fluidization of the alimentary bodies.

25. Arrangement as claimed in claim 15, characterized in that the resonator part consists of a tube resonator with a length corresponding to a half wavelength of the generated low-frequency sound wave.

26. Arrangement as claimed in clami 15, characterized in that the resonator part consists of tube resonator with a length corresponding to a quarter of a wavelength of the generated low-frequency sound wave, the lower end of which, facing away from the pulsator, is connected to a Helmholtz resonator, and in that the two resonators together form a resonator with the same resonance frequency as the resonance frequency of the individual resonators.

27. Arrangement as claimed in claim 25 or claim 26, characterized in that the tube resonator consists of several parts with mutually different diameters.

28. Arrangement as claimed in claim 26, characterized in that the Helmholtz resonator is funnel-shaped and in that the outlet for the alimentary bodies is situated at the bottom of the Helmholtz resonator.

29. Arrangement as claimed in claim 13, characterized in that the resonator part consists of two tube resonators, each of which has a length corresponding to a quarter of the wavelength of the generated low-frequency sound.

30. Arrangement as claimed in claim 29, characterized in that the two tube resonators each have a pulsator and in that said pulsators operate in counterphase so that a common standing sound wave of low-frequency sound is generated inside the two tube resonators.

31. Arrangement as claimed in claim 30, characterized in that the tube resonators are situated adjacent to each other so that their respective open ends, facing away from the pulsators, are communicating through a common space.

32. Arrangement as claimed in claim 31, characterized in that the common space at the open ends of the tube resonators consists of a container which collects the alimentary bodies for removal via an outlet.

33. Arrangement as claimed in claim 12, characterized in a device being provided, the device being selected from the group consisting of obstacles and tray bottoms, the devices being positioned in a transport path for the alimentary body through the arrangement, the alimentary body being transported along the device, cooling pipes with cooling agent being provided beneath the device for cooling the alimentary body being transported on the device.

34. Arrangement as claimed in claim 12, characterized in the arrangement has a container with an upper end having an inlet and a lower end having an outlet, the alimentary body being introduced into the container through the inlet and being discharged from the outlet, the container further has a longitudinal axis extending between the upper end and the lower end with the alimentary body spiraling around the longitudinal axis as the alimentary body moves from the inlet to the outlet of the container, the container generally being fixed in location and nonmovable when the alimentary body is passing therethrough.

* * * * *